(12) United States Patent
Seol et al.

(10) Patent No.: US 9,252,864 B2
(45) Date of Patent: Feb. 2, 2016

(54) METHOD AND APPARATUS FOR FAST BEAM-LINK CONSTRUCTION IN MOBILE COMMUNICATION SYSTEM

(71) Applicants: Samsung Electronics Co., Ltd, Gyeonggi-do (KR); Korea Advanced Institute of Science and Technology, Daejeon (KR)

(72) Inventors: Jiyun Seol, Gyeonggi-do (KR); Heeseong Yang, Seoul (KR); Joohwan Chun, Daejeon (KR); Sanghyouk Choi, Chungcheongbuk-do (KR)

(73) Assignees: Samsung Electronics Co., Ltd., Suwon-Si (KR); Korea Advanced Institute of Science and Technology, Daejeon (KR)

( * ) Notice: Subject to any disclaimer, the term of this patent is extended or adjusted under 35 U.S.C. 154(b) by 46 days.

(21) Appl. No.: 14/146,629

(22) Filed: Jan. 2, 2014

(65) Prior Publication Data
US 2014/0187168 A1    Jul. 3, 2014

(30) Foreign Application Priority Data
Jan. 2, 2013    (KR) .................. 10-2013-0000064

(51) Int. Cl.
| H04B 1/00 | (2006.01) |
|---|---|
| H04B 15/00 | (2006.01) |
| H04B 7/08 | (2006.01) |
| H04B 7/06 | (2006.01) |
| H04B 7/04 | (2006.01) |
| H04W 72/04 | (2009.01) |

(52) U.S. Cl.
CPC .............. *H04B 7/086* (2013.01); *H04B 7/0617* (2013.01); *H04B 7/0404* (2013.01); *H04W 72/046* (2013.01)

(58) Field of Classification Search
CPC .............................. H04B 7/086; H04B 7/0404
USPC ................ 455/63.4, 562.1, 101, 63.1, 67.13, 455/575.7
See application file for complete search history.

(56) References Cited

U.S. PATENT DOCUMENTS

| 7,096,041 | B2 * | 8/2006 | Brunner et al. | 455/562.1 |
|---|---|---|---|---|
| 7,792,547 | B1 * | 9/2010 | Smith et al. | 455/562.1 |
| 7,986,742 | B2 * | 7/2011 | Ketchum et al. | 375/267 |
| 8,737,507 | B2 * | 5/2014 | Astely et al. | 375/267 |
| 2007/0092019 | A1 * | 4/2007 | Kotecha et al. | 375/267 |
| 2009/0051594 | A1 * | 2/2009 | Na et al. | 342/373 |
| 2009/0270118 | A1 * | 10/2009 | Jin et al. | 455/517 |
| 2010/0103045 | A1 * | 4/2010 | Liu et al. | 342/372 |
| 2010/0158151 | A1 * | 6/2010 | Krauss et al. | 375/267 |
| 2010/0246494 | A1 * | 9/2010 | Sanayei | 370/328 |
| 2011/0013711 | A1 * | 1/2011 | Wang et al. | 375/267 |
| 2011/0032839 | A1 * | 2/2011 | Chen et al. | 370/252 |
| 2012/0281781 | A1 * | 11/2012 | Xiao et al. | 375/267 |

* cited by examiner

*Primary Examiner* — Marceau Milord

(57) ABSTRACT

A method of forming a beam-link by a Base Station (BS) in a wireless communication system using a beamforming scheme includes determining at least one downlink beams to be used for downlink transmission and/or reception, transmitting a reference signal to a Mobile Station via the at least one downlink beam, receiving the reference signal via an uplink beam from the Mobile station, and updating the at least one downlink beam to increase a Signal-to-Noise Ratio (SNR). Accordingly, a beam-link using an initial beam-link between the BS and the MS and adaptive beamforming can be rapidly constructed in a high frequency band BDMA cellular system.

14 Claims, 13 Drawing Sheets

FIG. 4
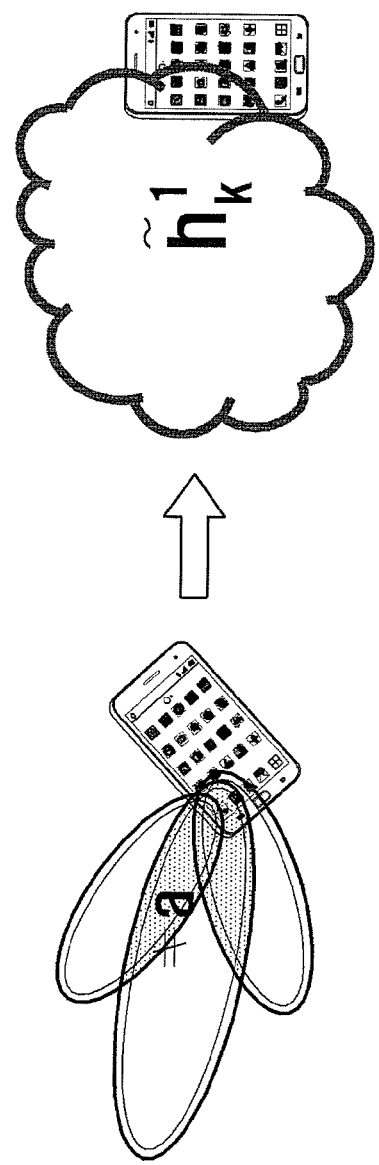
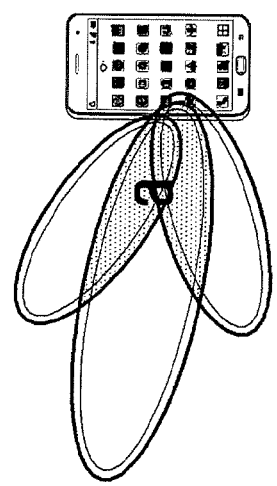

FIG. 6

| Transmission time slot | Transmit signal | Receive signal | Corresponding values of phase shifters in a subarray |
|---|---|---|---|
| 1-st | $b_k^i s_1$ | $y_{M,1}^i = f_1^H H b_k^i s_1 + n_1$ | $f_1^H = [0.5\ 0.5\ 0.5\ 0.5]$ |
| 2-nd | $b_k^i s_1$ | $y_{M,2}^i = f_2^H H b_k^i s_1 + n_2$ | $f_2^H = [0.5\ 0.5j\ -0.5\ -0.5j]$ |
| 3-rd | $b_k^i s_1$ | $y_{M,3}^i = f_3^H H b_k^i s_1 + n_3$ | $f_3^H = [0.5\ -0.5\ 0.5\ -0.5]$ |
| 4-th | $b_k^i s_1$ | $y_{M,4}^i = f_4^H H b_k^i s_1 + n_4$ | $f_4^H = [0.5\ 0.5j\ -0.5\ 0.5j]$ |

FOUR TRANSMISSIONS FROM BS TO MS $$y_M^i = F_4^H Hb_k^i s_1 + F_4^H n$$

$$\tilde{h}_k^i = Hb_k^i + n = \frac{1}{s_1}(F_4^H)^{-1} y_M^i = \frac{1}{s_1} F_4 y_M^i \quad \left[ F^H = [f_1 \ f_2 \ f_3 \ f_4]^H \right] \quad i=0,1$$

EFFECTIVE CHANNEL VECTOR AND RECEIVE SIGNALS FOR RESPECTIVE ANTENNA ELEMENTS INCLUDED IN ONE SUBARRAY WHEN RX IS MS

FIG. 8

| Transmission time slot | Transmit signal | Receive signal | Corresponding values of phase shifters in a subarray |
|---|---|---|---|
| 1-st | $(\tilde{h}_k^0)^* s_1$ | $y_{B,1}^i = f_1^T H^T \left( \dfrac{\tilde{h}_k^0}{\|\tilde{h}_k^0\|_2} \right)^* s_1 + n_1$ | $f_1^T = [0.5\ 0.5\ 0.5\ 0.5]$ |
| 2-nd | $(\tilde{h}_k^0)^* s_1$ | $y_{B,2}^i = f_2^T H^T \left( \dfrac{\tilde{h}_k^0}{\|\tilde{h}_k^0\|_2} \right)^* s_1 + n_2$ | $f_2^T = [0.5\ -0.5j\ -0.5\ 0.5j]$ |
| 3-rd | $(\tilde{h}_k^0)^* s_1$ | $y_{B,3}^i = f_3^T H^T \left( \dfrac{\tilde{h}_k^0}{\|\tilde{h}_k^0\|_2} \right)^* s_1 + n_3$ | $f_3^T = [0.5\ -0.5\ 0.5\ -0.5]$ |
| 4-th | $(\tilde{h}_k^0)^* s_1$ | $y_{B,4}^i = f_4^T H^T \left( \dfrac{\tilde{h}_k^0}{\|\tilde{h}_k^0\|_2} \right)^* s_1 + n_4$ | $f_4^T = [0.5\ 0.5j\ -0.5\ -0.5j]$ |

FIG. 9

$$y_{B,1}^i = f_1^T H^T \left( \frac{\tilde{h}_k^0}{\|\tilde{h}_k^0\|_2} \right)^* s_1 + n_1$$

$$y_{B,4}^i = f_4^T H^T \left( \frac{\tilde{h}_k^0}{\|\tilde{h}_k^0\|_2} \right)^* s_1 + n_4$$

$$y_{B,1}^i = f_4^T H^T \left( \frac{\tilde{h}_k^0}{\|\tilde{h}_k^0\|_2} \right)^* s_1 + F_4^T n$$

$$H^T (\tilde{h}_k^0)^* s_1 + n = (F_4^T)^{-1} y_B^i \Rightarrow y_B^i = F_4^* y_B^i$$

RECEIVE SIGNALS FOR RESPECTIVE ANTENNA ELEMENTS INCLUDED IN ONE SUBARRAY WHEN RX IS BS

FOUR TRANSMISSIONS FROM BS TO MS

METHOD AND APPARATUS FOR FAST BEAM-LINK CONSTRUCTION IN MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application No. 10-2013-0000064 filed in the Korean Intellectual Property Office on Jan. 2, 2013, the entire disclosure of which is hereby incorporated by reference.

TECHNICAL FIELD

The present disclosure relates generally to a method and an apparatus for rapidly constructing a beam-link in a wireless communication system. More particularly, the present disclosure relates to a method of effectively constructing a beam-link for increasing a receive Signal-to-Noise Ratio (SNR) by using alternating reference signal transmission between a Base Station (BS) and a Mobile Station (MS), and an apparatus supporting the same.

BACKGROUND

In general, a mobile communication system was developed to provide voice services while guaranteeing activity of users. However, the mobile communication system has gradually expanded its service area up to a data service as well as a voice service, and currently provides a high speed data service. Accordingly, the wireless data traffic demand has continuously increased, and thus a need to support a high data transmission rate has been created.

In general, a method of providing a high data transmission rate includes a method of using a wider frequency band and a method of improving a frequency efficiency. However, in the latter case, it is not easy in reality to further increase the frequency use efficiency through the improvement of technologies since communication technologies of a current generation already provide a frequency use efficiency close to a theoretical limit. Accordingly, a technology using a wide frequency band is spotlighted.

Since a current mobile communication cellular system using a frequency band (<5 GHz) has difficulty in securing a wide frequency band, it is required to secure such a broadband frequency in a higher frequency band. Bands enabling broadband communication at frequencies equal to or higher than 1 GHz are limited by current frequency distribution policy, so that a method using a millimeter wave band equal to or higher than 30 GHz for wireless communication is needed.

However, in such a high frequency band, a problem of seriously generating signal attenuation according to a distance is created. Specifically, propagation path loss increases as a transmission frequency for wireless communication becomes higher, and accordingly, a distance of arrival becomes relatively shorter and a service coverage is reduced. One of main technologies to alleviate the propagation path loss and increase the distance of arrival in order to solve the above problem is a beamforming technique.

Transmit beamforming corresponds to a method of generally concentrating signals transmitted from respective antennas of a plurality of antennas on a particular direction. A type in which a plurality of antennas are arranged may be referred to as an array antenna and an antenna included in the array antenna may be referred to as an element antenna or an antenna element.

Through the use of the transmit beamforming, the distance that the signal can be received, and interference influencing another user is significantly reduced since the signal is almost not transmitted in any direction other than the corresponding direction.

Meanwhile, a receiving side can perform receive beamforming by using a reception array antenna. The receive beamforming corresponds to a technique of concentrating received radio waves on a particular direction to increase the intensity of received signals incident to the corresponding direction, thereby blocking an interference signal.

Such a beamforming technique is advantageous to a communication system of a high frequency band. As a transmission frequency is higher, a wavelength of the radio wave becomes shorter. Accordingly, when antennas are arranged at an interval of half waves, the array antenna can be configured using many more antennas within the same area. That is, the communication system operating at a high frequency band is well positioned to apply the beamforming technique because the communication system can acquire a relatively higher antenna gain in comparison with using the beamforming technique at a low frequency band.

SUMMARY

To address the above-discussed deficiencies that when the number of the antennas is increased for increasing the antenna gain, the overhead corresponding to the channel state information estimation is also increased, it is a primary object to provide a method of efficiently constructing a beam-link which can reduce overheads for a Channel State Information (CSI) estimation in a high frequency band Beam Division Multiple Access (BDMA) cellular system and increase quality of communication even when an orientation of an MS is frequently changed.

Another aspect of the present disclosure is to provide a method of rapidly constructing a beam-link by using an adaptive beam weight update based on alternating reference signal transmission between a BS and an MS and narrow beam combining.

In accordance with an aspect of the present disclosure, a method of forming a beam-link by a Base Station in a wireless communication system using a beamforming scheme is provided. The method includes: determining at least one downlink beam to be used for downlink transmission and/or uplink reception, transmitting a reference signal to a Mobile Station via the at least one downlink beam, receiving the reference signal via an uplink beam from the Mobile station, and updating the at least one downlink beam to increase a Signal-to-Noise Ratio (SNR).

In accordance with another aspect of the present disclosure, a method of forming a beam-link by a Mobile Station in a wireless communication system using a beamforming scheme is provided. The method includes determining at least one uplink beam to be used for uplink transmission and/or downlink reception, receiving a reference signal from a Base Station via the at least one uplink beam, and updating the at least one uplink beam by applying a Maximal Ratio Combining (MRC) weight to the at least one uplink beam.

In accordance with another aspect of the present disclosure, a Base Station forming a beam-link in a wireless communication system using a beamforming scheme is provided. The Base Station includes a transceiver that transmits and/or receives a signal to/from a Mobile Station, and a controller that determines at least one downlink beam to be used for downlink transmission and/or uplink reception, transmits a reference signal to a Mobile Station via the downlink beam, receives the reference signal via an uplink beam from the Mobile Station, and updates the downlink beam to increase a Signal-to-Noise Ratio (SNR).

In accordance with another aspect of the present disclosure, a Mobile Station forming a beam-link in a wireless communication system using a beamforming scheme is provided. The Mobile Station includes a transceiver that transmits and/or receives a signal to/from a Base Station; and a controller that determines at least one uplink beam to be used for uplink transmission and/or downlink reception, receives a reference signal from the Base Station via the at least one uplink beam, and updates the at least one uplink beam by applying a Maximal Ratio Combining (MRC) weight to the at least one uplink beam.

According to the present disclosure, a beam-link using an initial beam-link between a BS and an MS and adaptive beamforming can be rapidly constructed in a high frequency band BDMA cellular system. Further, according to the present disclosure, unlike beam sweeping handling conventional short distance communication, the beam can be constructed in an actual cellular system environment.

Since the beam-link can be constructed through at best one or two alternating reference signal transmission between the BS and the MS, the present disclosure is suitable for a beam-link constructing method in a suddenly changing communication channel state. In addition, according to the present disclosure, an optimal beam-link is selected from some beam-link combinations extracted based on initial wide beams covering a sector set in all beam-link combinations available in one-to-one match adaptive beamforming between the BS and the MS as basic information, so that the beam-link can be efficiently updated.

Meanwhile, the present disclosure needs a small amount of time resources spent for reference signal transmission for the beamforming weight update (including uplink beam and downlink beam) and does not require a separate process for a feedback, thereby easily controlling uplink and downlink resources in comparison with a method of estimating full CSI.

According to the present disclosure, the beam-link can be simultaneously updated during data communication without a separate training time except for a training time for which an initial beam-link is formed by using detected symbols as the reference signal. Accordingly, the beam-link can be simultaneously updated during the data communication by storing symbols detected during the data communication and as many receive signals corresponding to the detected symbols as a maximum number of elements included in a subarray in a memory.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

The above and other objects, features and advantages of the present disclosure will be more apparent from the following detailed description in conjunction with the accompanying drawings, in which:

FIGS. 3 and 4 illustrate a concept in which a BS splits a wide beam into narrow beams and an MS uses an omni-directional beam adaptively fitted to dominant signals received by a Maximal Ratio Combining (MRC);

FIG. 6 is a view describing a process of transmission and/or reception from a BS to an MS for beam updating when a maximum number of element antennas of an array (sub) antenna included in the MS is four;

FIG. 7 is a view describing a method of separating signals (in element antenna level) and estimating an MRC weight of $\tilde{h}_k^i$ in the MS employing (sub)arrays having four element antennas;

FIGS. 8 to 10 are views describing a process of updating a beamforming weight of a BS;

DETAILED DESCRIPTION

Figure 1A:
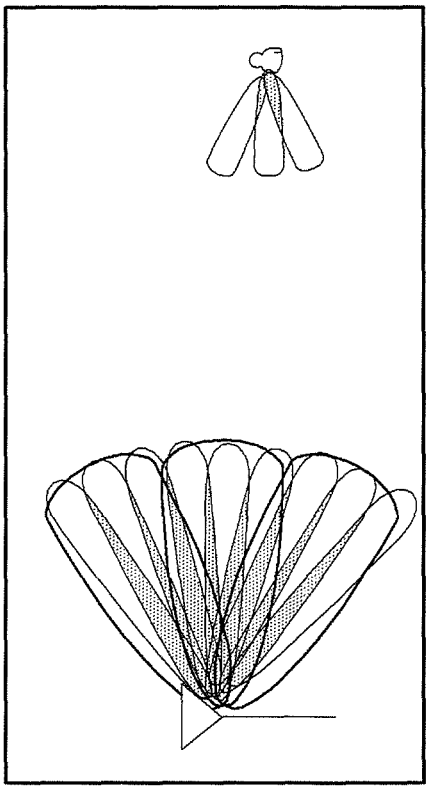
FIGS. 1A and 1B are views describing a fixed beam-based beam sweeping.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, various embodiments of the present disclosure will be described with reference to the accompanying drawings. Further, in the following description of the present disclosure, a detailed description of known functions and configurations incorporated herein will be omitted when it may make the subject matter of the present disclosure rather unclear.

A Multiple Input Multiple Output (MIMO) channel estimation-based diversity gain can be acquired after an optimal channel estimation value is calculated in terms of least squares, Mini-Mental State Examination (MMSE) or the like and space-time coding, Maximal Ratio Combining (MRC)

and the like are performed through the use of the calculated optimal channel estimation value.

Alternatively, the diversity gain can be acquired after Singular Value Decomposition (SVD) is performed on the channel estimation value and then beamforming is performed through the use of a singular vector corresponding to a maximum singular value. In general, a signal model in MIMO wireless communication is made as follows: $s_i = Hp_i + v_i$ In the above equation, $s_i$ denotes an r×1 received signal vector, H denotes an r×t MIMO channel matrix, $p_i$ denotes a t×1 training signal vector, and $v_i$ denotes an r×1 noise vector. The following equation can be acquired through N training signal receptions for a channel estimation.

$$S=HP+V,\ S=[s_1,\ldots,s_N],\ P=[p_1,\ldots,p_N],\ V=[v_1,\ldots,v_N]$$

When the above signal is acquired through the transmission and/or reception training, an optimal channel estimate in the terms of least squares is $\hat{H}_{LS}=SP^\dagger$ and $P^\dagger=P^H(PP^H)^{-1}$, and an estimation error is as follows:

$$J_{LS}=E\{\|H-\hat{H}_{LS}\|_F^2\}=E\{\|VP^\dagger\|_F^2\}=\sigma_n^2 r \cdot tr\{P^{\dagger H}P^\dagger\}=\sigma_n^2 r \cdot tr\{(PP^H)^{-1}\}$$

An optimal channel estimate in the terms of MMSE is:

$$H_{MMSE} = SA_0$$
$$A_0 = \arg\min_A E\{\|H-SA_0\|_F^2\}$$
$$A_0 = (P^H R_H P + \sigma_n^2 rI)^{-1} P^H R_H$$
$$\therefore \hat{H}_{MMSE} = S(P^H R_H P + \sigma_n^2 rI)^{-1} P^H R_H,$$

and an estimation error is expressed as follows:

$$R_E = E\{(H-\hat{H}_{MMSE})(H-\hat{H}_{MMSE})^H\} = \left(R_H^{-1}+\frac{1}{\sigma_n^2 r}PP^H\right)^{-1}$$
$$\therefore J_{MMSE} = tr\{R_E\} = tr\left\{\left(R_H^{-1}+\frac{1}{\sigma_n^2 r}PP^H\right)^{-1}\right\}$$

An optimal solution in the terms of SNR maximization is made by performing SVD by using the calculated channel estimate and then determining a singular vector corresponding to a maximum singular value as a transmit and/or receive beamforming weight.

In order to acquire a general MIMO channel estimation-based diversity gain, it is basically required to transmit many reference signals (or training signals) to a Mobile Station (MS) from a Base Station (BS. When the MS provides feedback of channel information to the BS, overheads can be generated due to large amounts of information. In other words, in order to acquire the channel estimation-based diversity gain, many downlink and uplink resources are needed.

Further, Because of the large path loss in a high frequency band communication, if the above method is applied directly to the high frequency band communication, an incomplete channel estimation due to a low SNR can be an important factor of communication capability deterioration. Accordingly, the system attempts to configure transmitting and receiving sides by using a plurality of antenna elements to acquire sufficient transmit and/or receive power in case of attenuation of transmit power. However, as the number of antenna elements in the transmitting and receiving sides increases, downlink and uplink resources required for the channel estimation also increase, thereby making the overhead problem more serious.

Further, since an intensity of a received signal can become equal to or smaller than an intensity of noise in a condition, such as initial communication where there is no channel information, a countermeasure thereof is also needed. The overheads during a process of acquiring channel information and the low SNR in the initial communication where there is no channel information can be resolved by using directional beamforming without using channel information-based beamforming.

However, unlike a conventional MS antenna having an omni-beam pattern, in a case of an MS antenna having a directional beam pattern, a frequent orientation change of the MS causes a frequent channel change, which results in a change in a directional beam weight in a predetermined direction with respect to a reference coordinate. As a result, a countermeasure with a higher frequency is needed to guarantee quality of communication.

For example, it is required to frequently perform a partial CSI estimation or a DOA estimation on the received signal of the MS and frequently update the beamforming weight in accordance with the frequent estimation.

As described above, the problem can occur in an order of the attenuation of transmit power due to the use of the high frequency band→compensation for the attenuation of the transmit power and the use of many antenna elements in order to improve the receive SNR→the increase in overheads in the channel estimation and the generation of a problem in securing the receive SNR in the initial communication→communication after the directional beam without CSI or with only partial CSI→the need of a countermeasure with a higher frequency in case of the change in terminal's orientation.

Meanwhile, in M×N beam sweeping-based transmit and/or receive beamforming, M transmit beams and N receive beams can be preset between the transmitting side and the receiving side.

Figure 1B:
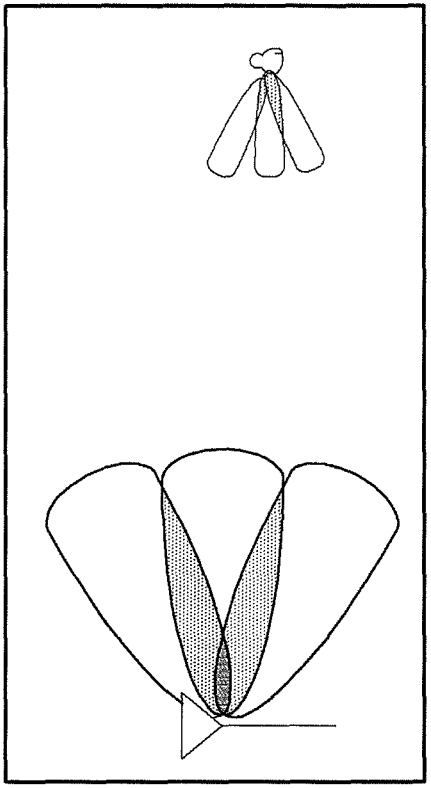

FIGS. 1A and 1B are views describing a fixed beam-based beam sweeping. FIG. 1A illustrates a case of sector level training, and FIG. 1B illustrates a case where a beam level training is applied.

As illustrated in FIGS. 1A and 1B, numbers of cases made by sweeping fixed beams of FIGS. 1A and 1B correspond to 3*3 and 9*3, respectively. At this time, for all the number of cases, the receive SNR is compared and a beam-link indicating a maximum receive SNR is used.

In M×N beam sweeping-based transmit and/or receive beamforming as illustrated in FIGS. 1A and 1B, IEEE 802.15.3c (WPAN) and IEEE 802.11ad (WLAN) proposes that M transmit beamformings and N receive beamformings, that is, M×N beamforming combinations be performed between BSs and MSs in one-to-one match, a receive SNR be measured, and then a beam-link indicating a maximum receive SNR be selected and used.

However, such a specification does not specifically disclose beam-link forming using adaptive beamforming which can improve quality of communication as an environment in which communication is performed using a fixed beam in a state of one-to-one match between the BSs and the MSs. Further, the specification has a difficulty in being applied to a cellular system since it corresponds to a communication link construction through beam sweeping in a WPAN or WLAN environment.

Accordingly, the present disclosure intends to provide a method of reducing overheads for the CSI estimation in a high frequency band BDMA cellular system and rapidly constructing an adaptive beam communication link that improves quality of communication in case of frequent changes in an MS's orientation.

To this end, the present disclosure uses an adaptive beam weight update based on alternating reference signal transmission between the BS and the MS and narrow beam combining. At this time, the adaptive beam weight can be applied to both an analog beam and a digital beam.

Figure 2:
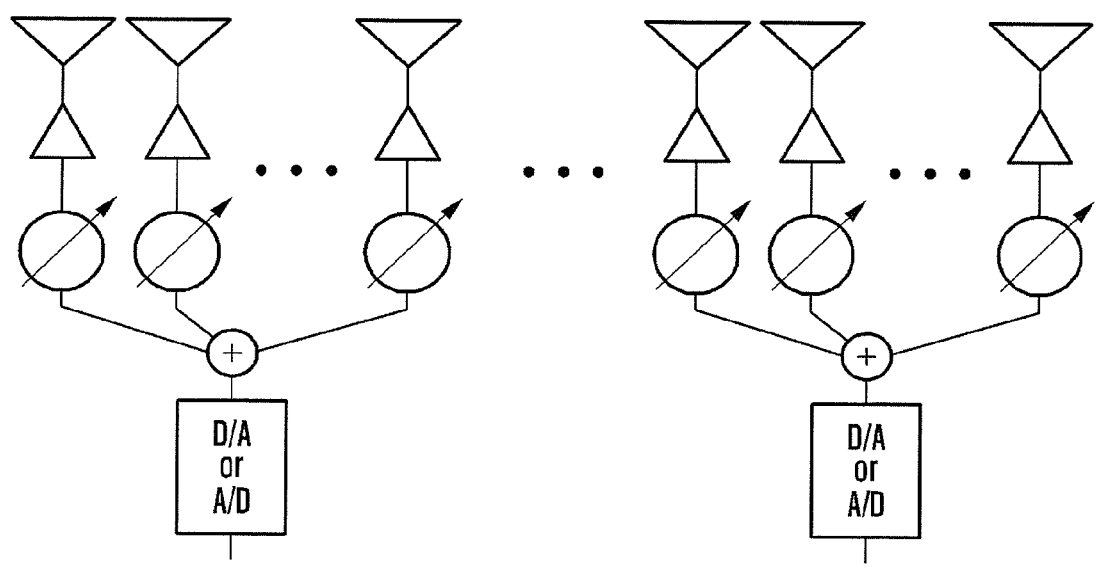
FIG. 2 is a view describing a transceiver according to an embodiment of the present disclosure.

FIG. 2 is a view describing a transceiver according to an embodiment of the present disclosure. As illustrated in FIG. 2, the transceiver basically corresponds to a transceiver configuring a subarray by tying a plurality of antenna elements to a single Radio Frequency (RF) chain.

A channel for each antenna element of the transceiver has a phase shifter and a power amplifier for analog beamforming. Further, a converter acting as a D/A converter in a transmit mode and as an A/D converter in a receive mode can be connected to each subarray.

Figure 3:
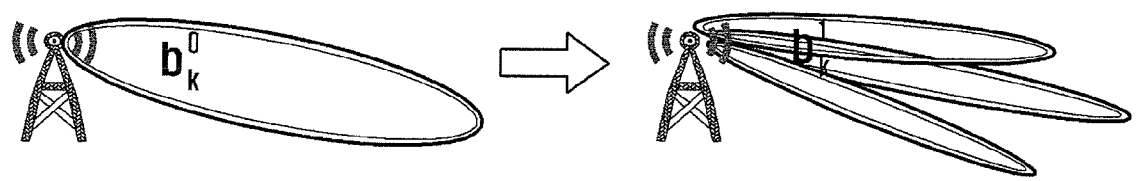

FIGS. 3 and 4 illustrate a concept in which the BS splits a wide beam into narrow beams and the MS uses an omni-directional beam adaptively fitted to dominant signals received by a Maximal Ratio Combining (MRC).

As illustrated in FIG. 3, the BS splits a wide beam which was initially designed based on narrow beam combining to update a transmit and/or receive beamforming weight into several narrow beams to improve the receive SNR. A detailed split method will be described below with reference to the accompanying drawings.

As illustrated in FIG. 4, when an orientation of the MS is changed, a phase of an antenna is changed. FIG. 4 illustrates a concept of applying the MRC weight from a received signal in order to overcome a difficulty of uni-directional beamforming by the orientation the MS.

The beam split and MRC weight calculation can be performed interdependently through the alternating reference signal transmission. As a result, based on an assumption of channel reciprocity, the transmit and/or receive beamforming of the BS uses an updated beam weight of $b_k^1$ and the transmit and/or receive beamforming of the MS uses an MRC weight of $\tilde{h}_k^1$ corresponding to the updated beamforming weight, which forms the beam-link. A detailed method will be described below with reference to the accompanying drawings.

Figure 5:
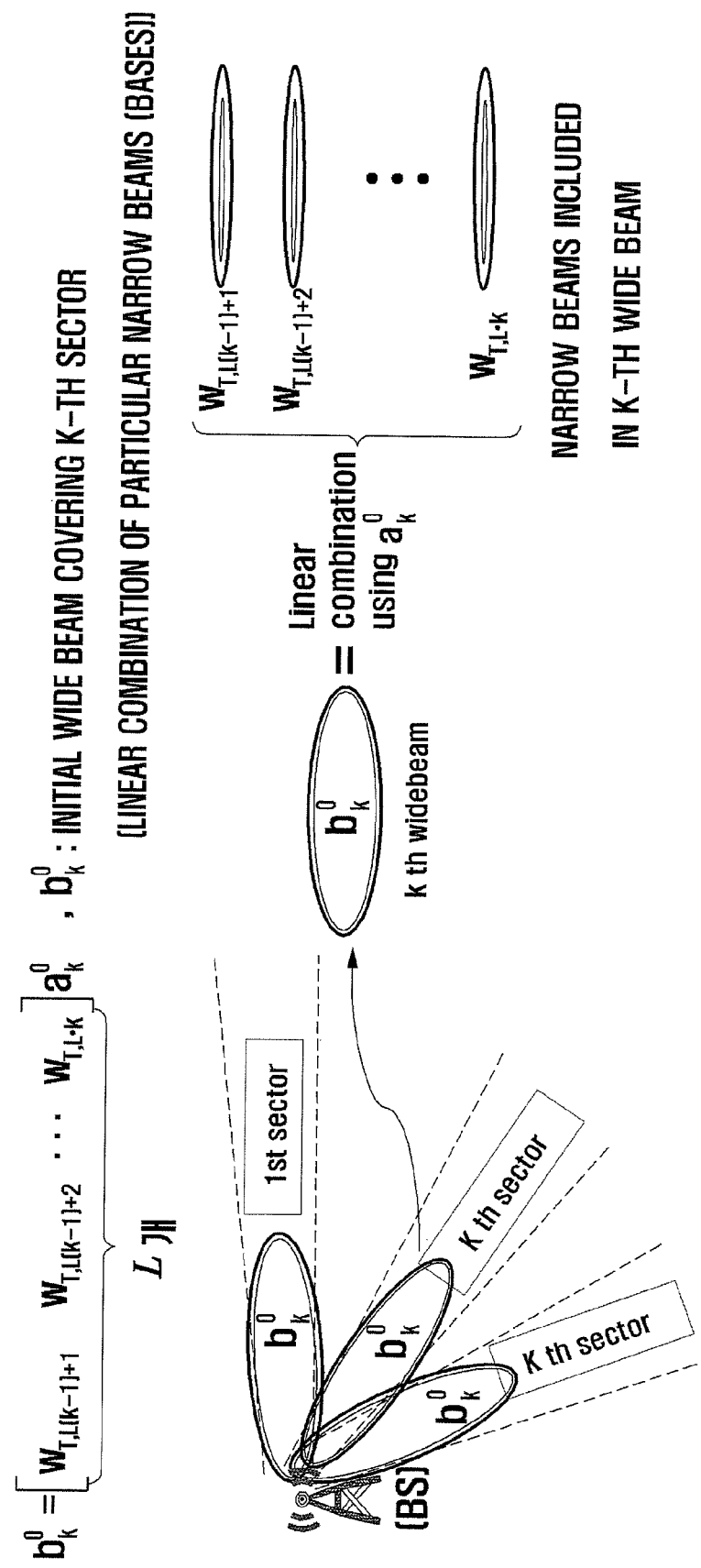
FIG. 5 is a view describing a configuration of an initial wide beam of $b_k^0$.

FIG. 5 is a view describing a configuration of an initial $b^0$ wide beam of $b_k^0$.

First, a beam-link indicating a maximum receive SNR is selected from initial beam-link candidates formed by the wide beam used for broadcasting by the BS and the MRC weight of the MS, and it is assumed that synchronization between downlink and uplink is completed.

The selection of the initial beam-link means that the BS has grasped a position of the MS located at a k-th sector among a plurality of sectors covered by the BS (without generality loss) and that an initial wide transmit and/or receive beam of the BS of $b_k^0$ has been set. As illustrated in FIG. 5, $b_k^0$ can be a linear combination of the narrow beams, such as $w_{T,L(k-1)+1}$, $w_{T,L(k-1)+2}$, and $w_{T,L \cdot k}$.

FIG. 6 is a view describing a process of transmission and/or reception from the BS to the MS for beam updating when a maximum number of element antennas of the array (sub) antenna included in the MS is four.

FIG. 6 illustrates a case where i=6 after the initial transmit and/or receive beam of the BS of $b_k^0$ is set. For example, FIG. 6 illustrates a process in which the MS transmits a reference signal to separate signals according to respective antennas when the maximum number of element antennas included in one array (sub)antenna is four.

The transmit beamforming is constant as $b_k^0$ for four times, and the BS carries S1 corresponding to the reference signal on $b_k^0$ to transmit S1. The MS can form a receive beam using a column of a DFT matrix or a column of a Hadamard matrix to receive $b_k^0$ and establish a foundation to separate signals according to respective antenna elements. A detailed method of separating signals will be described with reference to FIG. 7.

FIG. 7 is a view describing a method in which the MS having four element antennas separates signals and estimates an MRC weight of $\tilde{h}_k^i$.

As illustrated in FIG. 7, the MS can straightforwardly separate receive signals by multiplying a vector including signals received four times by the DFT matrix or the Hadamard matrix. Since the receive signal separation can be simultaneously performed for all subarrays, the receive signals for the subarray can be separated as receive signals according to respective antenna elements.

In FIG. 7, the separated signal can be used to acquire $\tilde{h}_k^0$ to be used as the transmit and/or receive beam of the MS, and then the MS can transmit a reference signal to the BS based on $\tilde{h}_k^0/\|\tilde{h}_k^0\|_2$ as the transmit beamforming weight. When the BS receives the reference signal as $b_k^0$, the BS can acquire the same receive SNR as the receive SNR of a previous MS based on an assumption of channel reciprocity, but can perform a process of updating the beamforming weight in order to acquire a higher SNR. A detailed process will be described with reference to FIGS. 8 to 10.

Figure 10:
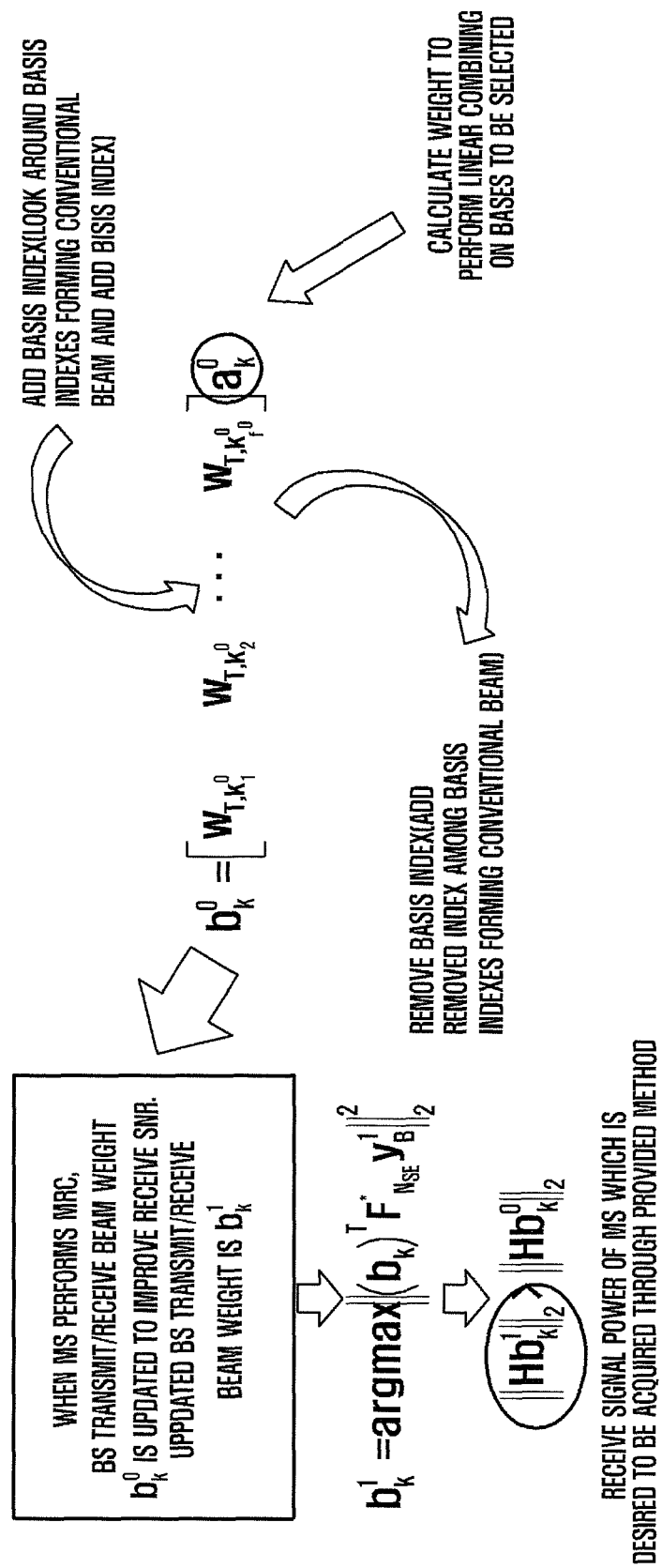

FIGS. 8 to 10 are views describing a process of updating the beamforming weight.

As discussed in the description of FIGS. 6 and 7, the BS can transmit the reference signal to the MS based on $b_k^1$ corresponding to the transmit and/or receive beamforming weight of the BS acquired through a process of receiving the signals→separating the signals→updating the beamforming weight as the transmit beam. (i=1 in FIGS. 6 and 7).

Thereafter, the MS can acquire $\tilde{h}_k^1$ in the same way as that of $\tilde{h}_k^0$ and use $\tilde{h}_k^1/\|\tilde{h}_k^1\|_2$ as the transmit and/or receive beamforming weight.

It will be expressed by an equation below.

Final BS transmit and/or receive beamforming weight is:

$$b_k^1 = [w_{T,k_1^1}, w_{T,k_2^1} \cdots w_{T,k_{f^1}^1}] a_k^1.$$

Final MS transmit and/or receive beamforming weight is: $\tilde{h}_k^1/\|\tilde{h}_k^1\|_2$.

Meanwhile, the process is described by an equation below when an analog beamforming weight is a constant modulus since an RF terminal has no power amplifier.

Final BS transmit and/or receive beamforming weight is:

$$b_k^1 = [w_{T,k_1^1}, w_{T,k_2^1} \cdots w_{T,k_{f^1}^1}] a_k^1$$

$$b_k^1 \Longleftarrow [\phi(b_k^1(1)) \; \phi(b_k^1(2)) \; \ldots \; \phi(b_k^1(N))] /$$

$$\|[\phi(b_k^1(1)) \; \phi(b_k^1(2)) \; \ldots \; \phi(b_k^1(N))]\|_2.$$

Final MS transmit and/or receive beamforming weight:

$\tilde{h}_k^1/\|\tilde{h}_k^1\|_2$ $\tilde{h}_k^1/\|\tilde{h}_k^1\|_2 = m \Longleftarrow [\phi(m(1))\phi(m(2)) \ldots \phi(m(M))]/\|[\phi(m(1))\phi(m(2)) \ldots \phi(m(M))]\|_2$ N denotes a number of element antennas of a transmitter, M denotes a number of antenna elements of a receiver, $b_k^1(j)$ denotes a j-th element of $b_k^1$, m(j) denotes a j-th element of m, and $\phi(x)$ corresponds to a complex value having the same phase as a phase of x and the modulus of 1.

It is remarkable in the above description that a wide beam is conceptually divided into several narrow beams since $b_k^1$ are linearly combined into the smaller number of narrow beams than the number of $b_k^1$.

Figure 11:
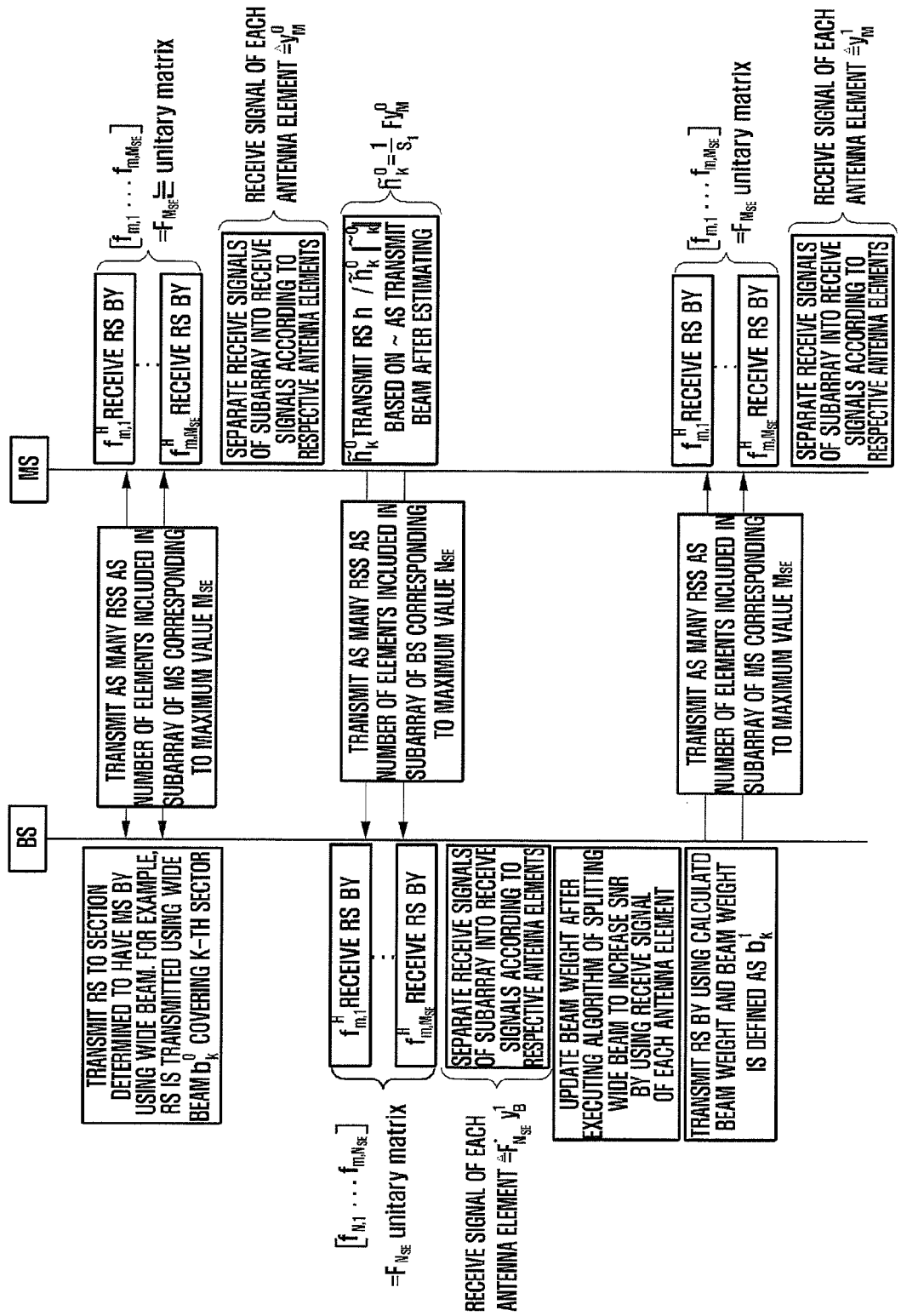
FIG. 11 is a view describing a process of forming a beam-link according to the present disclosure.

FIG. 11 is a view describing a process of forming the beam-link according to the present disclosure.

As illustrated in FIG. 11, the ES can transmit the reference signal to a sector expected to have the MS by using a wide beam. At this time, the BS can transmit as many reference signals as the number of antenna elements included in the subarray of the MS via the downlink transmit beams.

Thereafter, the MS can receive the reference signal via the downlink beams and separate the reference signal into receive signals according to respective antenna elements. Next, the MS can transmit as many reference signals as the number of antenna elements included in the subarray of the BS via the uplink transmit beams applying the MRC weight.

Then, the BS can receive reference signal via the uplink beams and separate beams reference signal into receive signals according to respective antenna elements. Thereafter, the MS can update the weight by splitting the wide beam in a direction of increasing the SNR and transmit the reference signal via the downlink beams applying the weight.

Figure 12:
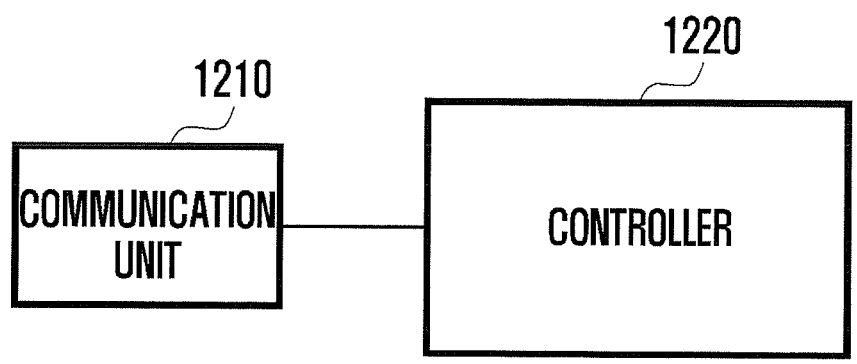
FIG. 12 is a block diagram illustrating an internal configuration of a BS according to an embodiment of the present disclosure.

FIG. 12 is a block diagram illustrating an internal configuration of the BS according to an embodiment of the present disclosure. As illustrated in FIG. 12, the BS according to the present disclosure can include a transceiver 1210 and a controller 1220.

The transceiver 1210 transmits/receives data or a signal to/from the MS or an adjacent BS. Further, the controller 1220 controls a signal flow between blocks of the BS for general operations of the BS.

Particularly, the controller 1220 can control the beam-link according to the present disclosure. Specifically, the controller determines one or more downlink beams to be used for downlink transmission and/or reception. Further, the controller transmits the reference signal via the downlink to the MS. As many reference signals as the number of antenna elements included in the subarray of the MS can be transmitted.

The controller can receive the reference signal via an uplink beam from the MS by using the downlink beam. Further, the controller can separate the reference signal into signals as the number of antenna elements included in the subarray of the BS. Thereafter, the controller can determine a beam weight in a direction of increasing an SNR by using the separated reference signal to update the downlink beam.

Figure 13:
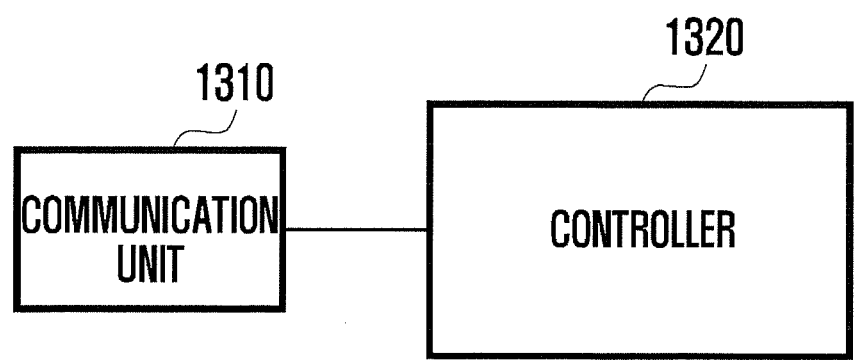
FIG. 13 is a block diagram illustrating an internal configuration of an MS according to an embodiment of the present disclosure.

FIG. 13 is a block diagram illustrating an internal configuration of the MS according to an embodiment of the present disclosure.

As illustrated in FIG. 13, the MS according to the present disclosure can include a transceiver 1310 and a controller 1320.

The transceiver 1310 transmits and/or receives data or a signal to/from the BS. Further, the controller 1320 controls a signal flow between blocks of the MS for general operations of the MS.

Particularly, the controller 1320 can control the beam-link according to the present disclosure. Specifically, the controller can receive a reference signal via a downlink beam. As many reference signals as the number of antenna elements included in the subarray of the MS can be transmitted.

Further, the controller can receive as many the reference signal via as the number of antenna elements included in the subarray of the MS via the downlink beams to acquire separated signals. Thereafter, the controller can determine an MRC weight by using the separated signal to update the uplink beam.

The MS according to an embodiment of the present disclosure refers to a portable electronic device, such as a Personal Digital Assistant (PDA), a navigation device, a digital broadcasting receiver, a Portable Multimedia Player (PMP) or the like.

A discussion of various special features typically provided in wireless communication systems may be found in, for example, U.S. Patent Application Publication No. 20130258964, which is incorporated herein in its entirety.

Those skilled in the art can appreciate that it is possible to implement the present disclosure in another specific form without changing the technical idea or the indispensable characteristics of the present disclosure. Therefore, it should be understood that the above-described embodiments are illustrative and are not limiting under any possible interpretation. The scope of the present disclosure is defined by the appended claims to be described later, rather than the detailed description. Accordingly, it should be appreciated that all modifications or variations derived from the meaning and scope of the appended claims and their equivalents are included in the range of the present disclosure.

Meanwhile, although exemplary embodiments of the present disclosure have been shown and described in this specification and the drawings, they are used in general sense in order to easily explain technical contents of the present disclosure, and to help comprehension of the present disclosure, and are not intended to limit the scope of the present disclosure. It is obvious to those skilled in the art to which the present disclosure pertains that other modified embodiments on the basis of the spirits of the present disclosure besides the embodiments disclosed herein can be carried out.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for forming a beam-link by a base station in a wireless communication system using a beamforming scheme, the method comprising:
   determining at least one downlink beams to be used for downlink transmission and/or uplink reception;
   transmitting a plurality of downlink (DL) reference signals to a Mobile Station (MS) via the at least one downlink beam, wherein the plurality of DL reference signals are separated according to each antenna element in a subarray of the MS to estimate respective channel state for each antenna element;
   receiving a plurality of uplink (UL) reference signals via an uplink beam from the MS, each UL reference signal generated based on the estimated respective channel state; and
   updating the at least one downlink beam to increase a Signal-to-Noise Ratio (SNR) according to the received plurality of UL reference signals.

2. The method of claim 1, wherein updating the at least one downlink beam further comprises:
   determining a beam weight in a direction of increasing the SNR by using the plurality of separated DL reference signals to update the at least one downlink beam.

3. The method of claim 2, wherein transmitting the plurality of DL reference signal comprises:
transmitting as many DL reference signals as a number of antenna elements included in the subarray of the mobile station via the at least one downlink beam.

4. A method of forming a beam-link by a mobile station in a wireless communication system using a beamforming scheme, the method comprising:
determining at least one uplink beams to be used for uplink transmission and/or downlink reception;
receiving a plurality of downlink (DL) reference signals from a Base Station (BS) via a downlink beam;
separating the plurality of DL reference signals according to each antenna element in a subarray of the MS to estimate respective channel state for each antenna element; and
updating the at least one uplink (UL) beam comprising a plurality of UL reference signals, each UL reference signal generated based on the estimated respective channel state by applying a Maximal Ratio Combining (MRC) weight to the at least one uplink beam.

5. The method of claim 4, further comprising transmitting the plurality of UL reference signals via the updated uplink beam to the base station.

6. The method of claim 5, wherein updating the at least one uplink beam comprises applying the MRC weight by using the plurality of separated reference signals.

7. The method of claim 6, wherein transmitting the plurality of UL reference signals comprises transmitting as many UL reference signals as a number of antenna elements included in a subarray of the base station via the at least one uplink beam.

8. A base station forming a beam-link in a wireless communication system using a beamforming scheme, the base station comprising:
a transceiver configured to transmit and/or receive a signal to/from a mobile station; and
a controller configured to
determine at least one downlink beams to be used for downlink transmission and/or uplink reception,
transmit a plurality of downlink (DL) reference signals to a Mobile Station (MS) via the at least one downlink beam, wherein the plurality of DL reference signals are separated according to each antenna element in a subarray of the MS to estimate respective channel state for each antenna element,
receive a plurality of uplink (UL) reference signals via an uplink beam from the mobile station, each UL reference signal generated based on the estimated respective channel state, and
update the downlink beam to increase a Signal-to-Noise Ratio (SNR) according to the received plurality of UL reference signals.

9. The base station of claim 8, wherein the controller is configured to determine a beam weight in a direction of increasing the SNR by using the plurality of separated DL reference signals to update the at least one downlink beam.

10. The base station of claim 9, wherein the controller is configured to transmit as many DL reference signals as a number of antenna elements included in the subarray of the mobile station via the at least one downlink beam.

11. A mobile station forming a beam-link in a wireless communication system using a beamforming scheme, the mobile station comprising:
a transceiver configured to transmit and/or receive a signal to/from a base station; and
a controller configured to
determine at least one uplink beam to be used for uplink transmission and/or downlink reception,
receive a plurality of downlink (DL) reference signals from the Base Station via a downlink beam,
separating the plurality of DL reference signals according to each antenna element a subarray of the MS to estimate respective channel state for each antenna element, and
update the at least one uplink (UL) beam comprising a plurality of UL reference signals, each UL reference signal generated based on the estimated respective channel state by applying a Maximal Ratio Combining (MRC) weight to the at least one uplink beam.

12. The mobile station of claim 11, wherein the controller is configured to transmit the plurality of UL reference signals via the updated at least one uplink beam.

13. The mobile station of claim 12, wherein the controller is configured to apply the MRC weight to the plurality of separated reference signals.

14. The mobile station of claim 13, wherein the controller is configured to transmit as many UL reference signals as a number of antenna elements included in a subarray of the base station via the at least one uplink beam.

* * * * *